United States Patent
Miller

(10) Patent No.: US 10,104,079 B2
(45) Date of Patent: *Oct. 16, 2018

(54) AUTHENTICATION PROXY AGENT

(71) Applicant: BMC SOFTWARE, INC., Houston, TX (US)

(72) Inventor: Karl Frederick Miller, Dallas, GA (US)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,232

(22) Filed: May 11, 2017

(65) Prior Publication Data

US 2017/0250984 A1    Aug. 31, 2017

Related U.S. Application Data

(63) Continuation of application No. 13/931,560, filed on Jun. 28, 2013, now Pat. No. 9,654,473.

(51) Int. Cl.
*G06F 15/16* (2006.01)
*H04L 29/06* (2006.01)
(Continued)

(52) U.S. Cl.
CPC ........ *H04L 63/0884* (2013.01); *H04L 63/062* (2013.01); *H04L 63/0815* (2013.01); *H04W 12/04* (2013.01); *H04W 12/06* (2013.01); *H04L 9/00* (2013.01); *H04L 9/32* (2013.01); *H04L 63/0823* (2013.01); *H04L 63/12* (2013.01); *H04L 2209/76* (2013.01); *H04L 2209/805* (2013.01)

(58) Field of Classification Search
CPC .............. H04L 63/0884; H04L 63/062; H04L 63/0815; H04L 9/00; H04L 63/12; H04L 63/0823; H04L 9/32; H04L 2209/805; H04L 2209/76; H04W 12/04; H04W 12/06

See application file for complete search history.

(56) References Cited

U.S. PATENT DOCUMENTS 6,081,900 A    6/2000 Subramaniam et al.
6,226,752 B1   5/2001 Gupta et al.
(Continued)

FOREIGN PATENT DOCUMENTS

EP    1215597 A2   6/2002
EP    1533982 A2   5/2005
(Continued)

OTHER PUBLICATIONS

US 9,197,640, 11/2015, Miller (withdrawn)
(Continued)

*Primary Examiner* — Krisna Lim
(74) *Attorney, Agent, or Firm* — Brake Hughes Bellermann LLP

(57) ABSTRACT

An authentication engine may be configured to receive an authentication request and credentials from a client. The authentication engine may then generate a proxy agent configured to interact with an identity provider to authenticate the client on behalf of the client, using the credentials. In this way, the authentication engine may receive an assertion of authentication of the client from the identity provider, by way of the proxy agent.

20 Claims, 4 Drawing Sheets

(51) Int. Cl.
*H04W 12/04* (2009.01)
*H04W 12/06* (2009.01)
*H04L 9/32* (2006.01)
*H04L 9/00* (2006.01)

(56) References Cited

U.S. PATENT DOCUMENTS

| | | |
|---|---|---|
| 6,389,462 B1 | 5/2002 | Cohen et al. |
| 6,401,125 B1 | 6/2002 | Makarios et al. |
| 6,529,692 B1 | 3/2003 | Haines et al. |
| 6,539,482 B1 | 3/2003 | Blanco et al. |
| 6,640,302 B1 | 10/2003 | Subramaniam et al. |
| 6,763,468 B2 | 7/2004 | Gupta et al. |
| 6,772,214 B1 | 8/2004 | McClain et al. |
| 6,775,700 B2 | 8/2004 | Cheng et al. |
| 6,950,936 B2 | 9/2005 | Subramaniam et al. |
| 6,959,336 B2 | 10/2005 | Moreh et al. |
| 7,113,994 B1 | 9/2006 | Swift et al. |
| 7,174,565 B2 | 2/2007 | Kadyk et al. |
| 7,249,177 B1 | 7/2007 | Miller et al. |
| 7,313,816 B2 | 12/2007 | Sinha et al. |
| 7,506,055 B2 | 3/2009 | McClain et al. |
| 7,584,500 B2 | 9/2009 | Dillon et al. |
| 7,644,275 B2 | 1/2010 | Mowers et al. |
| 7,664,822 B2 | 2/2010 | Miller et al. |
| 7,716,722 B2 | 5/2010 | Swift et al. |
| 7,739,744 B2 | 6/2010 | Burch et al. |
| 7,747,856 B2 | 6/2010 | Favazza et al. |
| 7,818,435 B1 | 10/2010 | Jellinek et al. |
| 7,954,144 B1 | 5/2011 | Major et al. |
| 7,966,496 B2 | 6/2011 | Ellmore et al. |
| 7,987,501 B2 | 7/2011 | Miller et al. |
| 8,073,949 B2 | 12/2011 | Cunchon et al. |
| 8,327,426 B2 | 12/2012 | Kinser et al. |
| 8,533,803 B2 | 9/2013 | Cha et al. |
| 8,583,926 B1 | 11/2013 | Benson et al. |
| 8,590,008 B1 | 11/2013 | Ellmore et al. |
| 8,627,440 B2 | 1/2014 | Mowers et al. |
| 8,719,436 B2 | 5/2014 | Knight et al. |
| 8,793,490 B1 | 7/2014 | Szwalbenest et al. |
| 8,850,017 B2 | 9/2014 | Major et al. |
| 8,893,230 B2 | 11/2014 | Song et al. |
| 8,893,293 B1 | 11/2014 | Subramanium et al. |
| 9,118,657 B1 | 8/2015 | Shetty |
| 9,137,131 B1 | 9/2015 | Sarukkai et al. |
| 2002/0144009 A1 | 10/2002 | Cheng et al. |
| 2004/0073713 A1 | 4/2004 | Pentikainen et al. |
| 2004/0210756 A1 | 10/2004 | Mowers et al. |
| 2005/0021796 A1 | 1/2005 | McClain et al. |
| 2005/0076126 A1 | 4/2005 | Knight et al. |
| 2005/0108517 A1 | 5/2005 | Dillon et al. |
| 2006/0005020 A1 | 1/2006 | Hardt |
| 2006/0020508 A1 | 1/2006 | Gorti et al. |
| 2006/0075473 A1 | 4/2006 | Moreh et al. |
| 2006/0174323 A1 | 8/2006 | Brown et al. |
| 2006/0225132 A1 | 10/2006 | Swift et al. |
| 2007/0234408 A1 | 10/2007 | Burch et al. |
| 2007/0245411 A1 | 10/2007 | Newton et al. |
| 2008/0046984 A1 | 2/2008 | Bohmer et al. |
| 2008/0271121 A1 | 10/2008 | Hinton et al. |
| 2010/0070978 A1 | 3/2010 | Chawla et al. |
| 2010/0153946 A1 | 6/2010 | Bhaskar et al. |
| 2011/0138453 A1 | 6/2011 | Verma et al. |
| 2011/0314532 A1 | 12/2011 | Austin et al. |
| 2012/0066750 A1 | 3/2012 | McDorman et al. |
| 2013/0227663 A1 | 8/2013 | Cadenas et al. |
| 2014/0337914 A1 | 11/2014 | Pranam et al. |
| 2015/0007291 A1 | 1/2015 | Miller |
| 2015/0200924 A1 | 7/2015 | Parla et al. |

FOREIGN PATENT DOCUMENTS

| | | |
|---|---|---|
| WO | 0111821 A1 | 2/2001 |
| WO | 2012145827 A1 | 11/2012 |

OTHER PUBLICATIONS

Non Final Office Action for U.S. Appl. No. 13/931,560, dated Jun. 1, 2016, 11 pages.
Notice of Allowance for U.S. Appl. No. 13/931,560, dated Jan. 13, 2017, 9 pages.
"Access Manager for Oracle Access Management 11gR2 PS2", Technical White Paper, Oracle Corporation, Dec. 2013, Dec. 2013, 18 pages.
"Certificate-Based Single Sign-On Form EMC My Documentum for Microsoft Outlook Using CA Siteminder", White Paper, EMC Corporation, Dec. 2011, 33 pages.
"SAML Single Sign-On (SSO) Service for Google Apps", available online at<https://web.archive.org/web/20121213103407/https://developers.google.com/google-apps/sso/saml_reference_implementation>, retrieved on Nov. 5, 2015, Apr. 26, 2012, 3 pages.
"Security and Usability, How new authentication methods eliminate old trade-offs", Janrain, Inc., Mar. 2012, 7 pages.
"Using Microsoft's Messenger Connect API for Effective Social Distribution", White Paper, 2011, 15 pages.
Non-Final Office Action for U.S. Appl. No. 13/931,560, dated Dec. 24, 2014, 8 pages.
Notice of Allowance for U.S. Appl. No. 13/931,560, dated Dec. 16, 2015, 7 Pages.
Notice of Allowance for U.S. Appl. No. 13/931,560, dated Jul. 22, 2015, 8 pages.
"Response to Non-Final Office Action for U.S. Appl. No. 13/931,560, filed Jun. 24, 2015, 11 pages.", 11 pages.
CA Technologies , "CA Single Sign-On", available online at <http://www.ca.com/us/securecenter/ca-single-sign-on/details.aspx>, 4 pages.
Deshmukh, Mandar Vilas, et al., "Single sign on to a IBM WebSphere Portal through IBM Tivoli Access Manager WebSEAL", available online at <http://www.ibm.com/developerworks/tivoli/library/t-ssotam/>, retrieved on Nov. 5, 2015, Feb. 18, 2009, 21 pages.
Empson, Rip , "Gigya Launches Platform to Give Businesses Access to Users' Complete Social Identities", available online at <http://techcrunch.com/2011/11/02/gigya-launches-platform-to-give-businesses-access-to-users-complete-social-identities/>, Nov. 2, 2011, 9 pages.
Lasfargues, Vincent , "Atrium Single Sign on (Atrium SSO)", BMC Software, Inc, Feb. 15, 2013, 65 pages.
Oasis Standard , "Assertions and Protocols for Oasis Security Assertion Markup Language (SAML) V2.0", available on line at <https://docs.oasis-open.org/security/saml/v2.0/saml-core-2.0-os.pdf>, Mar. 15, 2005, 86 pages.
Oh, Changhun , "Dancing with OAuth: Understanding how Authorization Works", available online at <http://www.cubird.org/blog/dev-platform/dancing-with-oauth-understanding-how-authorization-works/>, 2012, 2012, 10 pages.
Rastogi, Ashutosh , "SAP BI Mobile Server Single Sign on Support", available online at <http://scn.sap.com/community/mobile/businessobjects/blog/2014/05/09/sap-bi-mobile-server-single-sign-on-support>, retrieved on Nov. 4, 2015, May 9, 2014, 5 pages.
Revtovich, Maria , "Single Sign-on to Web Applications Using the Reverse Proxy", OpenIAM Suite, Documentation, Version 3, available online at <http://wiki.openiam.com/display/IAMSUITEV3/Single+Sign-on+to+Web+Applications+Using+the+Reverse+Proxy>,, 13 pages.

AUTHENTICATION PROXY AGENT

RELATED APPLICATION

This application is a continuation application of U.S. application Ser. No. 13/931,560, filed Jun. 28, 2013, now U.S. Pat. No. 9,654,473, issued May 16, 2017, entitled "Authentication Proxy Agent", the contents of which is incorporated herein by reference.

TECHNICAL FIELD

This description relates to user authentication.

BACKGROUND

In many computing scenarios, it is required to authenticate a user, e.g., to verify an identity and/or authorization of the user, prior to granting access to computing resources requested by the user. For example, users often communicate with a provider of computing resources, using a computer network, in order to obtain access to the computing resources. Before granting access to the requested resources, the provider typically verifies an identity and authorization of the user to access the resources. For example, in typical scenarios, the user may be required to submit a username/password combination, which the provider may then verify against a stored database of username/password combinations.

Many scenarios exist in which user authentication is required, and many associated techniques, in addition to the use of a username/password combo as referenced above, may be used in such scenarios. In general, all such scenarios and techniques provide various burdens to both the user and the provider.

For example, the user is typically required to maintain and provide information (e.g., a username/password combination) required to complete the authentication process, whenever required by a provider. Meanwhile, the provider may be required to maintain and protect large amounts of user-specific information, particularly when a large number of users are authorized to access the provider's resources. The provider may be further required to execute all the various processes associated with authenticating each user, each time the user requests access.

Many techniques have been developed to alleviate these and related burdens on the provider and user. For example, techniques have been developed for single sign-on procedures, in which a single authentication process executed with respect to a particular user is relied upon to grant the user access to two or more computing resources. In some examples, an identity provider may provide a service of authenticating users on behalf of a provider of computing resources. In such examples, the provider is relieved of the burden of authenticating each user, based on a trust in the identity provider in providing authentication on behalf of the provider.

Nonetheless, burdens associated with user authentication continue to be problematic in many scenarios for providers and/or users. Consequently, users often experience dissatisfaction with their experience of provider's resources, while the providers experience reduced opportunities to provide their otherwise-available resources.

SUMMARY

According to one general aspect, a system may include instructions stored on a non-transitory computer readable storage medium and executable by at least one processor. The system may include an authentication engine configured to cause the at least one processor to receive an authentication request and credentials from a client. The authentication may be further configured to cause the at least one processor to generate a proxy agent configured to interact with an identity provider to authenticate the client on behalf of the client, using the credentials, and receive an assertion of authentication of the client from the identity provider, by way of the proxy agent.

According to another general aspect, a method may include receiving an authentication request and credentials from a client. The method may further include generating a proxy agent configured to interact with an identity provider to authenticate the client on behalf of the client, using the credentials, and receiving an assertion of authentication of the client from the identity provider, by way of the proxy agent.

According to another general aspect, a computer program product may include instructions recorded on a non-transitory computer readable storage medium and configured to cause at least one processor to receive an authentication request and credentials from a client. The instructions may be further configured to cause the at least one processor to generate a proxy agent configured to interact with an identity provider to authenticate the client on behalf of the client, using the credentials, and receive an assertion of authentication of the client from the identity provider, by way of the proxy agent.

The details of one or more implementations are set forth in the accompanying drawings and the description below. Other features will be apparent from the description and drawings, and from the claims.

DETAILED DESCRIPTION

Figure 1:
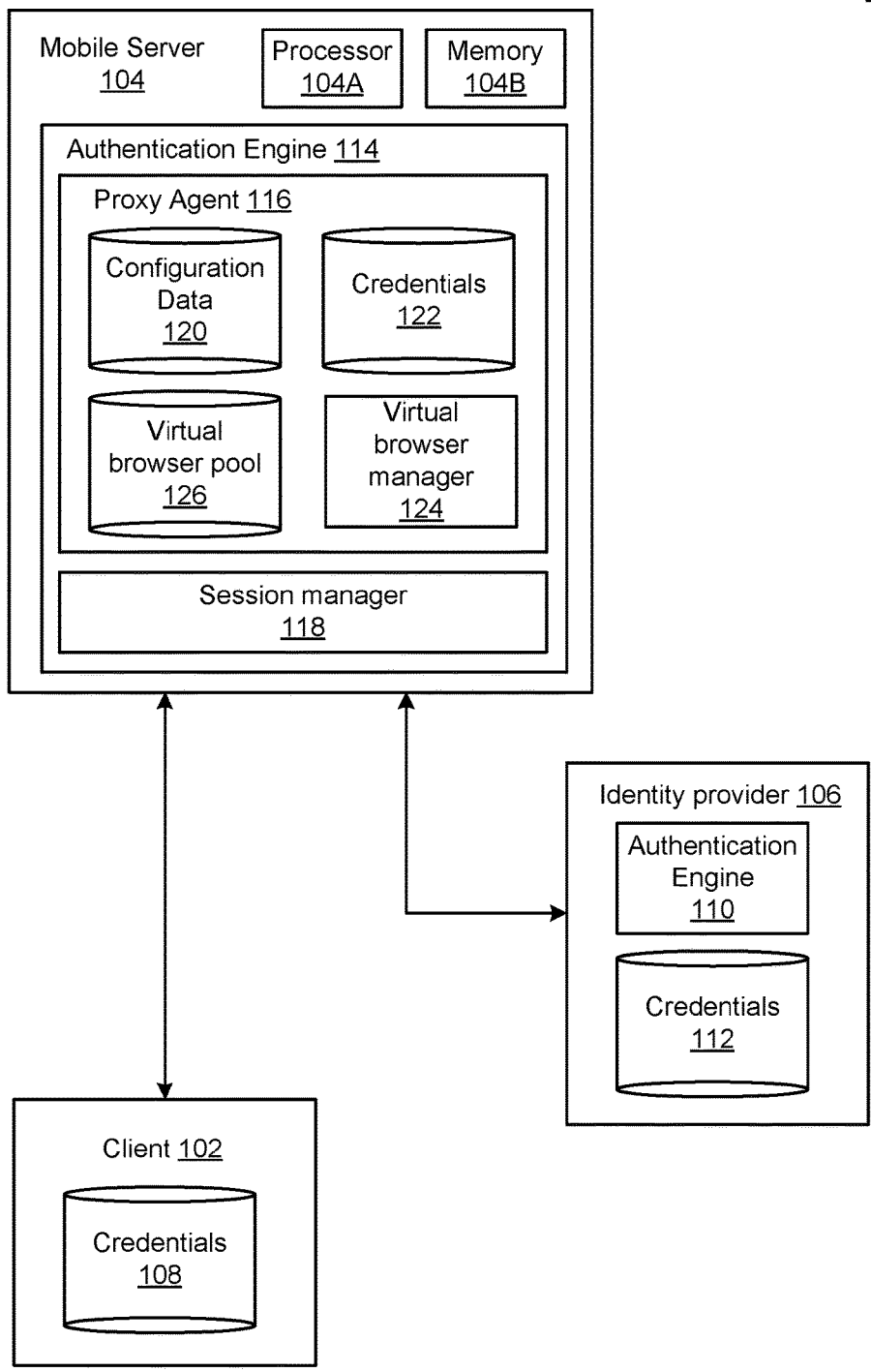
FIG. 1 is a block diagram of a system for user authentication.

FIG. 1 is a block diagram of a system 100 for providing user authentication. In the example of FIG. 1, a client 102 seeks access to computing resources provided by a mobile server 104. However, rather than authenticating the client 102 directly, the mobile server 104 utilizes services of an identity provider 106 to authenticate the client 102. More specifically, the mobile server 104 provides credentials 108 of the client 102 to an authentication engine 110 of the identity provider 106, for consideration thereof in comparison to previously-stored credentials 112. In this way, as described in detail below, resources and interactions required of the client 102 may be minimized, so that the client 102 may be implemented in a lightweight fashion, which is convenient to both a developer and user of the client 102. Meanwhile, the mobile server 104, in utilizing the identity provider 106, is relieved of many of the burdens typically associated with user authentication processes.

In the example of FIG. 1, the client 102 may represent virtually any application and associated device which may be used by a user thereof to access computing resources of the mobile server 104. For example, the client 102 may represent a full-featured browser application, running on a desktop computer. In many of the examples provided herein, however, the client 102 represents an application and associated device which is subject to non-trivial constraints in terms of available computing resources and/or network connectivity. For example, the client 102 may represent an application executing on a Smartphone, tablet, or other mobile device. Consequently, as just referenced, the client 102 may have a relatively limited amount of computing resources available, and, depending on a current location or other status of the client 102, may experience relatively high-latency communications with the mobile server 104.

In conjunction with the above description of the client 102, the mobile server 104 may similarly be understood to represent virtually any server or other computing device which is operable to provide computing resources to the client 102, e.g., over a network. However, as illustrated, the mobile server 104 is referred to as such, for the sake of consistency in referring to interactions with the client 102 in the various scenarios referenced above in which the client 102 executes on a mobile device.

In practice, as referenced above, the client 102 may be developed and deployed by a developer, for the use and enjoyment of a user of the client 102. Consequently, such a developer is typically well-aware that the client 102 will be deployed on a mobile device, and therefore subject to the types of computational and connectivity constraints referenced above. Advantageously, the system 100 allows such developers to develop the client 102, while including a minimal amount of resources associated with enabling the client 102 to authenticate itself with the mobile server 104. Therefore, developers may be more likely to develop and deploy applications, such as the client 102, which are enjoyed and utilized by a large number of users. From the user perspective, individual users are enabled to utilize a larger number of individual clients than would be possible if more computational resources were required for completing authentication of such clients. Moreover, users are enabled to utilize and enjoy such client applications with a minimum of delays associated with authentications thereof.

Meanwhile, the mobile server 104, as referenced above, utilizes fewer resources than would be required if the mobile server 104 were exclusively responsible for authenticating the client 102. On the other hand, compared to conventional scenarios, referenced below, in which the mobile server 104 might rely more extensively on services of the identity provider 106, the mobile server 104 may utilize a relatively greater amount of computing resources. Nonetheless, as described, such a marginal increase in requirements with respect to the mobile server 104 is more than offset with respect to the above-referenced advantages provided to users and developers of the client 102. Thus, the system 100, on net, provides significant advantages to the various entities associated therewith.

Thus, in operation of the system 100, the client 102 provides credentials 108, which are ultimately validated by the identity provider 106, which utilizes an authentication engine 110 to validate the credentials 108 against stored credentials 112. More specifically, as shown and described, an authentication engine 114 associated with the mobile server 104 may be configured to provide a proxy agent 116 that is operable to relay the credentials 108 to the identity provider 106, on behalf of the client 102.

Then, by virtue of the validation of the credentials 108 by the identity provider 106, a session manager 118 of the authentication engine 114 may create a session for the client 102 which will be trusted by the mobile server 104 for purposes of providing services to the client 102. In particular, as described below, the session manager 118 may create a trusted session for the client 102 with respect to two or more services provided by the mobile server 104, so that the client 102 experiences a single sign-on with respect to such services, and perhaps also with respect to services provided by the identify provider 106, if any.

In example embodiments, the identity provider 106 may be implemented as an otherwise-conventional identity provider, such as may be implemented in the context of current, standard authentication protocols. For example, example implementations described below (e.g., with respect to FIG. 4) utilize the identity provider 106 in the context of the known Security Assertion Markup Language (SAML) standard. However, it will be appreciated that the features and functions described herein with respect to the system 100 may be generally applicable with respect to any suitable authentication standard and/or protocol.

Thus, the credentials 108 should be understood to represent any suitable type of credential that would be compatible with a corresponding authentication protocol implemented by the identity provider 106. For example, the credentials 108 may include textual information, such as, e.g., username/password combinations, personal identification numbers, one-time passwords, certificated-based authentication, MS KERBEROS tokens, or biometric credentials.

Thus the identity provider 106 may be configured to implement the authentication engine 110 and the credentials 112 in a manner which facilitates some or all of the above-referenced authentication techniques, as needed. Depending on a size of a user base managed by the identity provider 106, the maintenance and management of such authentication services may require significant amounts of human and/or computational resources. Consequently, in many scenarios, the identity provider 106 may be understood to represent, for example, a large provider of services/resources over the Internet, operating as a wholly separate domain from a domain of the mobile server 104. That is, in such scenarios, the identity provider 106 may already be required to provide large-scale authentication services with respect to its own user base, so that it is mutually advantageous for the identity provider 106 to provide authentication services on behalf of the mobile server 104. For example, the mobile server 104 may thus be relieved of the burden of permanently storing user credentials (and associated authentication requirements), while the identity provider 106 may benefit from partnering with the mobile server 104 to provide mobile services to the client 102 (at minimal marginal/incremental cost to the identity provider). In this way, the identity provider 106 may be understood to provide a cross-domain, single sign-on experience to a user of the client 102.

Thus, in the example of FIG. 1, the client 102, wishing to establish a session with the mobile server 104, passes the credentials 108 thereto. Thereupon, the authentication engine 114 generates the proxy agent 116, which thereafter serves as a relay, acting on behalf of the client 102 with respect to the identity provider 106. In this way, as described, the client 102 is relieved from burdens associated with interacting directly with the identity provider 106.

As shown, the proxy agent 116 may include configuration data 120 which governs interactions of the proxy agent 116 with the identity provider 106. More detailed examples of the configuration data 120 are provided below, e.g., in the context of implementations of the system 100 which utilize the SAML standard.

As also shown, the proxy agent 116 receives and temporarily stores the credentials 122, which correspond or are otherwise related to the credentials 108 of the client 102. That is, the proxy agent 116 maintains the credentials 122 for purposes of validating the credentials 122 during interactions with the identity provider 106. However, once authentication occurs, the proxy agent 116 may delete the credentials 122 (or at least the portion thereof which related to the credentials 108), so that burdens associated with maintaining a store of credentials may be avoided by the authentication engine 114.

In the example of FIG. 1, the proxy agent 116 is illustrated as including a virtual browser manager 124, which has access to a plurality of virtual browsers stored within a virtual browser pool 126. For example, upon request for authentication by the client 102, the virtual browser manager 124 may select a virtual browser from the virtual browser pool 126. The selected virtual browser may then be utilized to conduct interactions with the identity provider 106, to thereby validate the credentials 108 of the user 102, as temporarily stored within the credentials 122 at the proxy agent 116.

In this regard, such a virtual browser should be understood to refer to software code executed by the proxy agent 116 in the context of the authentication engine 114, which includes some or all of the functionality that would normally be provided in the context of a conventional implementation of a browser. However, in the implementation of FIG. 1, such a virtual browser may be implemented without some or all of the standard user interface components, inasmuch as such components are not necessary for providing the intended functionality of relaying credential-related information between the client 102 and the identity provider 106.

In the example of FIG. 1, the virtual browser pool 126 may be utilized to provide a certain number of virtual browsers, so that a corresponding plurality of user authentication requests may be handled in a fast and efficient manner. For example, based on predictions of a number of authentication requests that will be handled within any given timeframe, as well as information characterizing a typical quantity of time required to handle each request, the virtual browser manager 124 may determine an optimal number of virtual browsers to maintain with the virtual browser pool 126. Of course, should additional virtual browsers be needed at any given time, the virtual browser manager 124 may simply commission an additional virtual browser accordingly. Somewhat similarly, in alternative implementations, the virtual browser manager 124 need not maintain the virtual browser pool 126, but may instead commission individual browsers on as-needed basis in a response to incoming authentication requests.

In the example of FIG. 1, the virtual browser pool 126 is illustrated as being included within the proxy agent 116. Accordingly, as referenced above, it may be understood that the proxy agent 116 may be generated by the authentication engine 114, and may thereafter be utilized to act as a proxy for multiple clients, such as the client 102, in interacting with the identity provider 106. In such cases, for example, it may be that the configuration data 120 governs a type of authentication standard or protocol to be implemented for all such authentication requests, while the credentials 122 represent a collection of user credentials associated with the various requests and clients, such as the client 102. In alternative implementations, however, it may occur that an individual proxy agent is generated for each corresponding authentication request.

In the example implementation of FIG. 1, as referenced above and described in detail below, the system 100 may implement a proxy version of the SAML authentication standard. In the conventional SAML authentication standard, it is assumed that a client requesting authentication is associated with a full-featured browser, so that the browser acts as the agent during interactions with an identity provider, such as the identity provider 106. In such contexts, such a full-feature browser typically receives an assertion document from the identity provider 106, which describes a session to be created in a generic form, e.g., in the format of an extensible markup language (XML) document, which thereby allows a server, such as the mobile server 104, to receive a description of information about a user or device associated with a client requesting authentication, without requiring such a server to be involved in the authentication process for creating such a session.

Advantageously, in the example implementations of FIG. 1, the client 102 need not execute a full-featured browser. Also advantageously, the client 102, when executing a mobile application that communicates with the mobile server 104, does not require that such a mobile application include related functions of a full-feature browser. Instead, as described, the client 102 may focus on including only or primarily those portions of a given mobile application which are relevant to the mobile application itself, while relying on the proxy agent 116 to provide authentication by way of the identity provider 106.

In the example of FIG. 1, the mobile server 104 is illustrated as including representative hardware components processor 104A and memory 104B. That is, the processor 104A may represent one or more processors that may be utilized to provide the various functionalities of the mobile server 104, using instructions stored in a non-transitory computer readable storage medium represented by the memory 104B. Meanwhile, the memory 104B may represent two or more such memories, where such memories may also be utilized to store data associated with operations of the mobile server 104, including, e.g., the credentials 122 and the configuration data 120. Of course, such hardware components are intended merely as simplified, representative elements, and the mobile server 104 will typically include many other otherwise-standard hardware/software components not specifically illustrated in the example of FIG. 1, such as, e.g., appropriate network interfaces for communicating with the client 102 and the identity provider 106.

Somewhat similarly, the specific, illustrated configuration of the authentication engine 114 should be understood to be a representative, non-limiting example. For example, in FIG. 1, the authentication engine 114 is illustrated as being executed by the mobile server. However, in alternative implementations, the authentication engine 114 may be implemented separately from, and in communication with, the mobile server 104.

Further, the authentication engine 114 is illustrated as including a number of components and subcomponents. However, again, such illustration should be understood to be merely representative. For example, any single component of the authentication engine 114 may be implemented as two or more subcomponents, while, conversely, two or more components may be combined for implementation as a single component.

Figure 2:
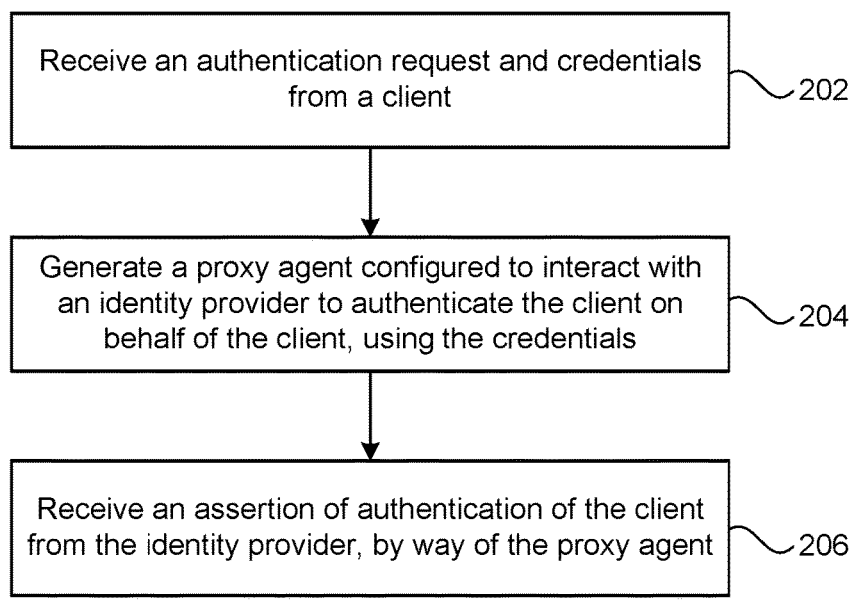
FIG. 2 is a flowchart illustrating example operations of the system of FIG. 1.

FIG. 2 is a flowchart 200 illustrating example operations of the system 100 of FIG. 1. In the example of FIG. 2, operations 202-206 are illustrated as separate, sequential operations. However, it may be appreciated that many additional or alternative operations or sub-operations may be included. Moreover, any two or more such operations or sub-operations may be executed in a partially or completely overlapping or parallel manner, and/or in a nested, iterative, looped, or branched fashion.

In the example of FIG. 2, an authentication request and credentials may be received from a client (202). For example, the authentication engine 114 may receive an authentication request from the client 102, along with client credentials 108.

A proxy agent, such as the proxy agent 116, may be generated, and configured to interact with an identity provider to authenticate the client on behalf of the client, using the credentials (204). For example, the proxy agent 116 may be configured to store the credentials 122 temporarily, while communicating with the identity provider 106. In this way, the identity provider 106 may utilize the authentication engine 110 and associated store of credentials 112 to validate the user credentials 108 on behalf of the client 102.

Thereafter, an assertion of authentication of the client may be received from the identity provider, by way of the proxy agent (206). For example, the authentication engine 114 may receive such an assertion from the identity provider 106, by way of the proxy agent 116. For example, in the examples described above in which the system 100 implements the SAML standard, the proxy agent 116 may communicate with the identity provider 106 in accordance with the configuration data 120, to thereby receive an assertion document from the identity provider 106. Thereupon, the session manager 118 may be configured to create a session at the mobile server, with respect to one or more services thereof, on behalf of the client 102.

Figure 3:
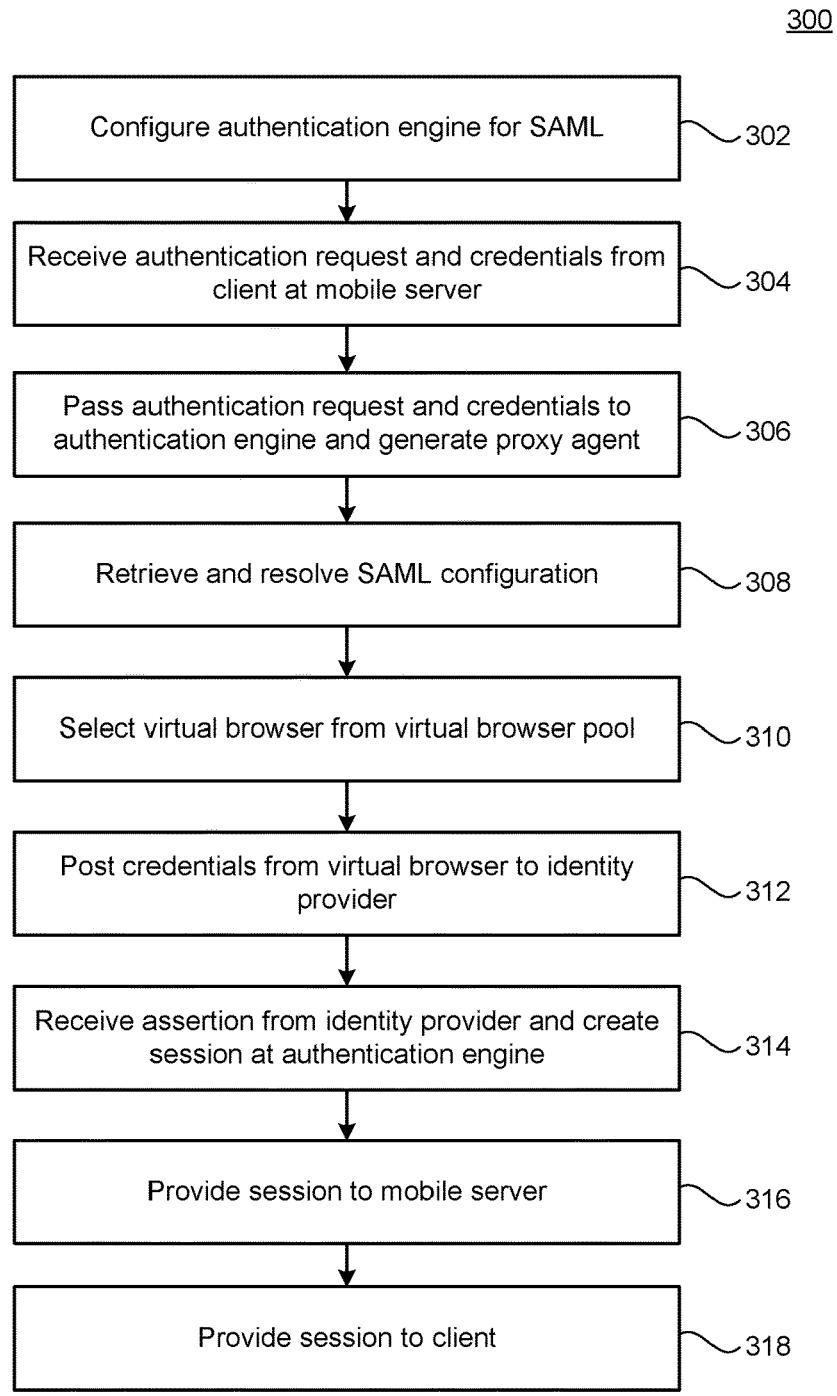
FIG. 3 is a second flowchart illustrating more detailed operations of the system of FIG. 1.
Figure 4:
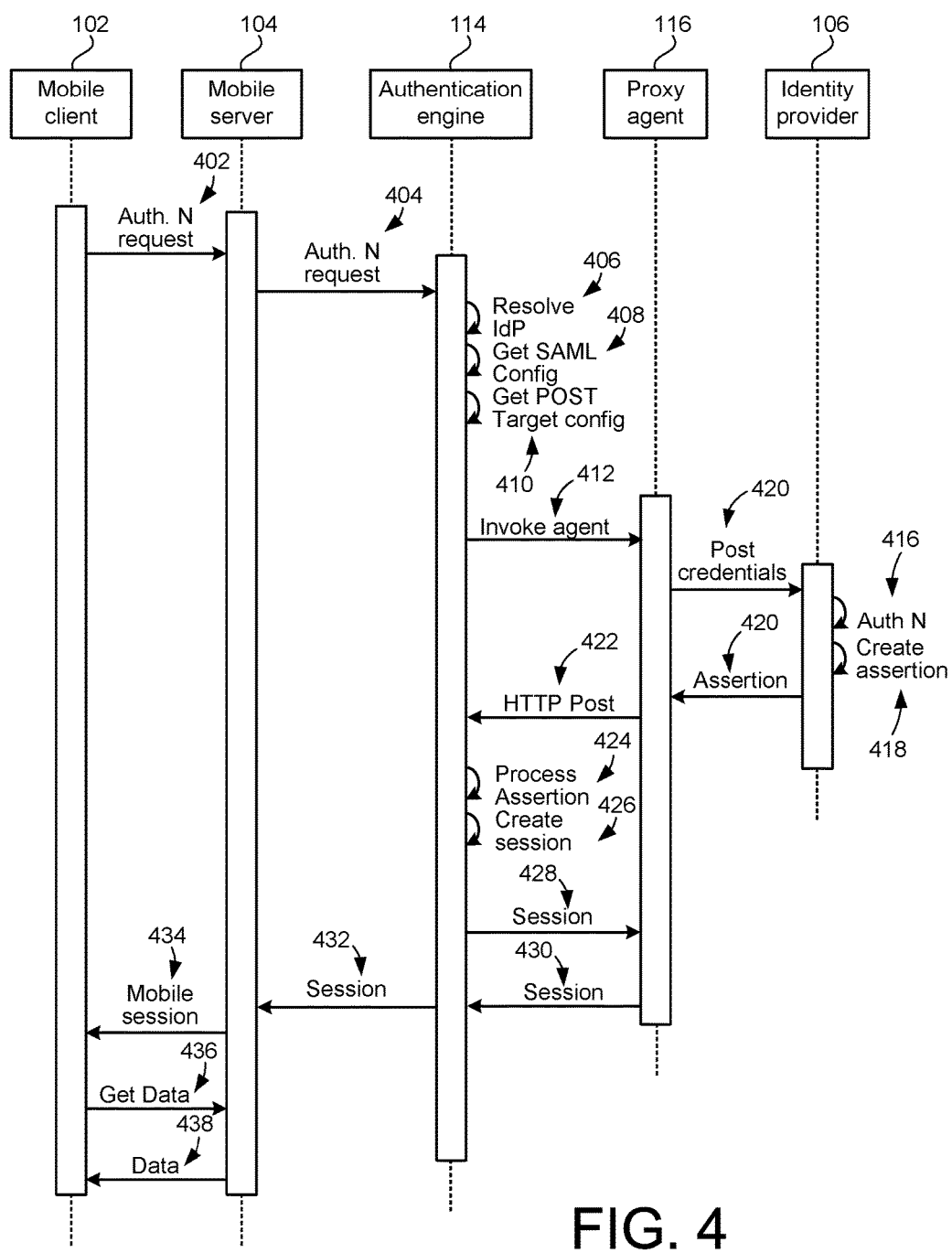
FIG. 4 is an interaction diagram illustrating example interactions between components of the system of FIG. 1 in an example implementation thereof.

FIG. 3 is a flowchart 300 illustrating more detailed example operations of the system 100 of FIG. 1, including more detailed examples regarding the use of the system 100 to implement the SAML standard. Meanwhile, FIG. 4 is an interaction diagram illustrating more specific interactions between various components of the system 100 of FIG. 1, in accordance with the operational flows of FIGS. 2 and 3, and in the context of implementing the SAML standard.

In the example of FIG. 3, the authentication engine 114 may be configured for authentication using the SAML standard (302). For example, it may be appreciated that it is possible to configure the authentication engine 114 to execute various different types of authentication policies. Consequently, configuring the authentication engine 114 to follow the SAML standard may include, e.g., instructing the authentication engine 114 to accept incoming authentication requests as SAML requests.

Further, such configuration may include all information associated with defining, storing, and utilizing the configuration data 120 of FIG. 1. For example, such SAML configuration data may include an identification of the identity provider 106 with respect to the client 102. It may be understood in this regard that a given client may be associated with one or more identity providers, while it may also be understood, conversely, that different clients may be associated with different identity providers.

Further, for a given identity provider, the configuration data 120 may specify various aspects and manners in which communication with the identity provider should occur. For example, the configuration data 120 may specify a type and format of messages to be exchanged with the identity provider 106. Additionally, the configuration data 120 may specify a sequence or timing according to which such messages may be exchanged, including, e.g., times specified for timeout (after which the exchange must be restarted, retried, or abandoned). Various other configuration data that may additionally or alternatively be utilized in the context of implementing the SAML standard also may be included in the configuration data 120.

Further in FIG. 3, an authentication request and credentials may be received from the client 102 at the mobile server 104 (304). For example, the mobile server 104 may provide a number of different services, and the client 102 may have access privileges for some or all such services. As described herein, the system 100 of FIG. 1 provides for a federated, single sign-on experience for the client 102 with respect to accessing all such services of the mobile server 104 (as well as those of the identity provider 106, if applicable). That is, as described, authentication by the authentication engine 114 may be leveraged by the mobile server 104 to provide permitted access to all such services to the client 102, based on the single validation of the client 102 by the identity provider 106.

Accordingly, the authentication request and credentials may be passed to the authentication engine 114, for generation of the proxy agent 116 based thereon (306). As just referenced above, the authentication engine 114 may be implemented with and by the mobile server 104, as illustrated in FIG. 1, or may be implemented separately from the mobile server 104.

The appropriate SAML configuration may be retrieved and resolved (308) by the authentication engine 114 for the context of the generated proxy agent 116. As a result, as may be appreciated from the above description, the proxy agent 116 may be provided with the appropriate configuration data 120.

A virtual browser may be selected from the virtual browser pool 126, by the virtual browser manager 124 (310). For example, as referenced above, the virtual browser manager 124 may select an available virtual browser from a number of virtual browsers that have been preconfigured but not yet instantiated for communicating with the identity provider 106 on behalf of the client 102.

The credentials of the client 102 may be posted from the selected virtual browser to the identity provider 106 (312). For example, the SAML standard typically relies on a secure HTTP (hypertext transfer protocol) channel, which may be utilized by the selected virtual browser to push the credentials to the identity provider 106. In communicating with the identity provider 106, the selected virtual browser may rely on aspects of the configuration data 120. For example, as referenced above, the selected virtual browser may determine a type, format, sequence, and timing of messages to be exchanged with the identity provider 106. The virtual browser manager 124 may be configured to monitor such interactions to ensure that the interactions conform to the relevant requirements.

An assertion may be received from the identity provider, so that a corresponding session may be created in response thereto (314). For example, the selected virtual browser may receive an assertion document and associated encrypted string from the identity provider 106. Similarly to a conventional browser, the selected virtual browser may verify a certificate or other proof of identity provided by the identity provider 106, before notifying the session manager 118 that it is permitted to create a new session at the mobile server 104 for the client 102.

Consequently, the session manager 118 may proceed to provide the newly-created session to the mobile server 104 (316), whereupon the mobile server 104 may provide the created session to the client 102 (318). In this way, as described, the client 102 may proceed to benefit from services provided by the mobile server 104, even though the mobile server 104 is not required to provide long-term credential storage on behalf of the client 102, or otherwise assume the burdens of directly authenticating the client 102.

Once authentication has occurred and the new session has been created, the virtual browser manager 124 may return a cleaned or erased version of the selected virtual browser to the virtual browser pool 126. Further, credentials of the credentials 122 corresponding to the credentials 108 to the client 102 may be deleted or otherwise removed from storage by the proxy agent 116. In some implementations, the proxy agent 116 may remain in operation, at least for a predetermined amount of time, in anticipation of receipt of a subsequent authentication request. In other implementations, or after passage of a predetermined amount of time, the authentication engine 114 may delete the proxy agent 116, and may generate a new proxy agent in response to a subsequently-received authentication request.

In the interaction diagram of FIG. 4, the mobile client 102 is illustrated as transmitting an authentication request 402 to the mobile server 104. The mobile server 104 executes a redirect (HTTP 302 operation) 404 of the authentication request to the authentication engine 114.

The authentication engine 114 resolves an identity of the identity provider 106 (406). The authentication engine 114 also retrieves the appropriate SAML configuration (408), and obtains the correct POST target configuration (410), all of which will be stored within the configuration data 120 of the proxy agent 116.

Accordingly, the authentication engine 114 invokes the proxy agent 116 (412), whereupon the proxy agent 116, in accordance with the configuration data 120 and the user credentials 122, proceeds to POST the user credentials (414) to the identity provider 106. More specifically, in the example of FIGS. 1 and 3, the proxy agent utilizes a virtual browser to POST the user credentials to the identity provider 106.

The identity provider 106 performs the authentication at its authentication engine 110, and based on available credentials 112 (416). The identity provider 106 then creates the SAML assertion (418), and transmits the assertion back to the proxy agent 116 (420), e.g., to the appropriate virtual browser. The proxy agent relays the assertion back to the authentication engine 114 by virtue of HTTP POST operation (422) (or, alternatively, by exchange through an appropriate, available application program interface (API)).

The authentication engine 114 may proceed to decrypt/decode the received assertion (424). The session manager 118 may then create a session based thereon (426). The session may be identified as such so the proxy agent 116 (428), which allows the type(s) of single sign-on experience(s) referenced above. For example, a session token (e.g., encrypted HTTP cookie) may be used to identify a mobile server session of the client 102 to various mobile server applications. The proxy agent 116 provides the session back to the authentication engine 114 (430).

The authentication engine 114 may thus identify the session to the mobile server 104 (432). In this way, the mobile session may be provided to the mobile client 102 (434). Consequently, the mobile client 102 is enabled to execute a get data request (436) or desired resources from the mobile server 104, and the mobile server 104 may securely provide the requested data (438) to the mobile client 102.

In the example of FIG. 4, it may be observed that all of the operations 406-430 related to executing the authentication of, and creating a new session for, the end-user mobile client occur between the authentication engine 114, its proxy agent 116, and the identity provider 106. In contrast, in conventional SAML configurations, many or all such interactions occur at a browser of an end-user client. By executing the operations 406-430 as shown and described with respect to FIG. 4, it may be appreciated that latencies associated with conducting such operations over a mobile/wireless network may be significantly reduced, and the computational burden placed on the mobile client 102, as compared to conventional techniques, also may be substantially reduced. As a result of these and other advantages of the various features and functions of FIGS. 1-4, it may be observed that such features and functions provide for a substantial improvement in the user experience of the authentication process. Meanwhile, a marginal burden placed on the mobile server 104/authentication engine 114 is relatively negligible, while a burden on application developers wishing to deploy applications in a context of the mobile server 104 is reduced.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semi-conductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A server comprising:
an authentication engine configured to cause at least one processor of the server to receive, at the server, an authentication request and credentials from a client;
store the credentials at the server;
generate, at the server, a proxy agent;
send, from the proxy agent, the credentials to an identity provider to authenticate the client on behalf of the client, using the credentials;
receive, at the proxy agent, an assertion of authentication of the client from the identity provider;
create a session for the client, based on the assertion; and
delete the stored credentials at the server.

2. The server of claim 1, wherein the authentication engine is implemented by a mobile server providing services to the client, and the client includes a mobile client.

3. The server of claim 1, wherein the authentication engine is configured to cause the at least one processor, in response to the receipt of the authentication request and credentials, to resolve a previously-stored authentication configuration, including identifying the identity provider from among a plurality of identity providers as being associated with the client.

4. The server of claim 1, wherein the proxy agent is configured to store configuration data governing content, format, and timing of interactions with the identity provider.

5. The server of claim 1, wherein the proxy agent includes a virtual browser manager configured to implement a virtual browser used to relay the credentials to the identity provider on behalf of the client.

6. The server of claim 5, wherein the virtual browser manager is configured to access a virtual browser pool storing a plurality of available virtual browsers, and to select the virtual browser therefrom.

7. The server of claim 1, wherein the proxy agent is configured to execute the Security Assertion Markup Language (SAML) standard with the identity provider, including receiving the assertion therefrom, on behalf of the client.

8. The server of claim 1, wherein the server includes a mobile server, and the authentication engine is provided by the mobile server, and wherein the session provides access to multiple services of the mobile server to the client.

9. A method comprising:
receiving, at a server, an authentication request and credentials from a client;
storing the credentials at the server;
generating, at the server, a proxy agent;
sending, from the proxy agent, the credentials to an identity provider to authenticate the client on behalf of the client, using the credentials;
receiving, at the proxy agent, an assertion of authentication of the client from the identity provider;
creating a session for the client, based on the assertion; and
deleting the stored credentials at the server.

10. The method of claim 9, wherein receiving the authentication request and credentials further comprises resolving a previously-stored authentication configuration, including identifying the identity provider from among a plurality of identity providers as being associated with the client.

11. The method of claim 9, wherein the proxy agent is configured to store configuration data governing content, format, and timing of interactions with the identity provider.

12. The method of claim 9, wherein the proxy agent includes a virtual browser manager configured to implement a virtual browser used to relay the credentials to the identity provider on behalf of the client.

13. The method of claim 9, wherein the proxy agent is configured to execute the Security Assertion Markup Language (SAML) standard with the identify provider, including receiving the assertion therefrom, on behalf of the client.

14. The method of claim 9, wherein the server includes a mobile server, and wherein the session provides access to multiple services of the mobile server to the client.

15. A computer program product including instructions recorded on a non-transitory computer readable storage medium and configured to cause at least one processor to:
receive, at a server, an authentication request and credentials from a client;
store the credentials at the server;
generate, at the server, a proxy agent;
send, from the proxy agent, the credentials to an identity provider to authenticate the client on behalf of the client, using the credentials;
receive, at the proxy agent, an assertion of authentication of the client from the identity provider;
create a session for the client, based on the assertion; and
delete the stored credentials at the server.

16. The computer program product of claim 15, wherein the instructions, when executed, are further configured, in response to the receipt of the authentication request and credentials, to resolve a previously-stored authentication configuration, including identifying the identity provider from among a plurality of identity providers as being associated with the client.

17. The computer program product of claim 15, wherein the proxy agent is configured to store configuration data governing content, format, and timing of interactions with the identity provider.

18. The computer program product of claim 15, wherein proxy agent includes a virtual browser manager configured to implement a virtual browser used to relay the credentials to the identity provider on behalf of the client.

19. The computer program product of claim 18, wherein the virtual browser manager is configured to access a virtual browser pool storing a plurality of available virtual browsers, and to select the virtual browser therefrom.

20. The computer program product of claim 15, wherein the proxy agent is configured to execute the Security Assertion Markup Language (SAML) standard with the identify provider, including receiving the assertion therefrom, on behalf of the client.

* * * * *